United States Patent
Reddick

(10) Patent No.: US 8,229,856 B1
(45) Date of Patent: Jul. 24, 2012

(54) MUSIC SUBSCRIPTION AND DISTRIBUTION FOR WIRELESS DEVICES

(75) Inventor: Paul S. Reddick, Overland Park, KS (US)

(73) Assignee: Sprint Spectrum LP., Overland Park, KS (US)

( * ) Notice: Subject to any disclaimer, the term of this patent is extended or adjusted under 35 U.S.C. 154(b) by 2127 days.

(21) Appl. No.: 11/204,197

(22) Filed: Aug. 9, 2005

Related U.S. Application Data

(60) Provisional application No. 60/654,282, filed on Feb. 17, 2005.

(51) Int. Cl.
*G06F 15/16* (2006.01)

(52) U.S. Cl. .......................................................... 705/50

(58) Field of Classification Search ............... 705/50–59
See application file for complete search history.

(56) References Cited

U.S. PATENT DOCUMENTS

| | | | |
|---|---|---|---|
| 6,205,140 B1 | 3/2001 | Putzolu et al. | 370/389 |
| 6,248,946 B1 | 6/2001 | Dwek | 84/609 |
| 6,359,902 B1 | 3/2002 | Putzolu | 370/466 |
| 6,449,638 B1 | 9/2002 | Wecker et al. | 709/217 |
| 6,463,534 B1 * | 10/2002 | Geiger et al. | 713/168 |
| 6,548,747 B2 | 4/2003 | Shibata et al. | 84/609 |
| 6,564,263 B1 | 5/2003 | Bergman et al. | 709/231 |
| 6,587,127 B1 | 7/2003 | Leeke et al. | 345/765 |
| 6,587,837 B1 | 7/2003 | Spagna et al. | 705/26 |
| 6,647,417 B1 | 11/2003 | Hunter et al. | 709/225 |

(Continued)

FOREIGN PATENT DOCUMENTS

WO    WO2004/090669 A2 * 10/2004

OTHER PUBLICATIONS

Liu et al., Participation Incentive Mechanisms in Peer-to-Peer Subscription Systems, IEEE Computer Society, Proceedings of the 35th Hawaii International Conference on System Sciences, Sep. 2002, 7 pages.*

(Continued)

*Primary Examiner* — James D Nigh

(57) ABSTRACT

A method for distributing music to a wireless communication device such as cellular telephone is provided. The method includes the step of providing a subscription service for the device, wherein the subscription service allows the device to download up to N music recordings onto the device from an on-line music content distribution site or sites, where N is an integer greater than one. The music is provided with restrictions designed to prevent effective transport of the music recordings off of the device in digital form such that the recordings cannot be played on other digital devices of any kind. The subscription service allows that the device may play the downloaded music recordings an unlimited number of plays. The subscription service also allows that the device may swap one music recording for another music recording, and may have a maximum number (S) of swaps in a given period. The service further includes billing the subscriber associated with the device a fee for the music subscription service. The values for N and S may be user configurable. The billing may also depend on the values of N and S.

3 Claims, 6 Drawing Sheets

U.S. PATENT DOCUMENTS

| | | | |
|---|---|---|---|
| 7,277,928 B2 * | 10/2007 | Lennon | 709/219 |
| 7,324,942 B1 * | 1/2008 | Mahowald et al. | 704/270 |
| 2002/0091848 A1 * | 7/2002 | Agresta et al. | 709/231 |
| 2002/0107803 A1 * | 8/2002 | Lisanke et al. | 705/51 |
| 2002/0196941 A1 * | 12/2002 | Isaacson et al. | 380/231 |
| 2003/0076963 A1 * | 4/2003 | Wells | 381/1 |
| 2004/0205028 A1 * | 10/2004 | Verosub et al. | 705/59 |
| 2005/0044049 A1 * | 2/2005 | Okayama et al. | 705/59 |
| 2006/0259434 A1 * | 11/2006 | Vilcauskas et al. | 705/57 |
| 2008/0015950 A1 * | 1/2008 | Al-Azzawe | 705/26 |
| 2008/0133416 A1 * | 6/2008 | Rhoads | 705/51 |

OTHER PUBLICATIONS

DRM Specification Candidate Version 2.0—Jul. 16, 2004, Open Mobile Alliance, OMA-DRM-DRM-V2_0-20040716-C, 142 pages.*

J-P Luoma et al, "*A Metadata Framework for Internet Media Guides: Baseline Data Model*", MMusic Internet-Draft Dec. 19, 2003.

M. Handley, "*SDP: Session Description Protocol*", Network Working Group RFC 2327, Apr. 1998.

U.S. Appl. No. 10/821,484, filed Apr. 9, 2004.

* cited by examiner

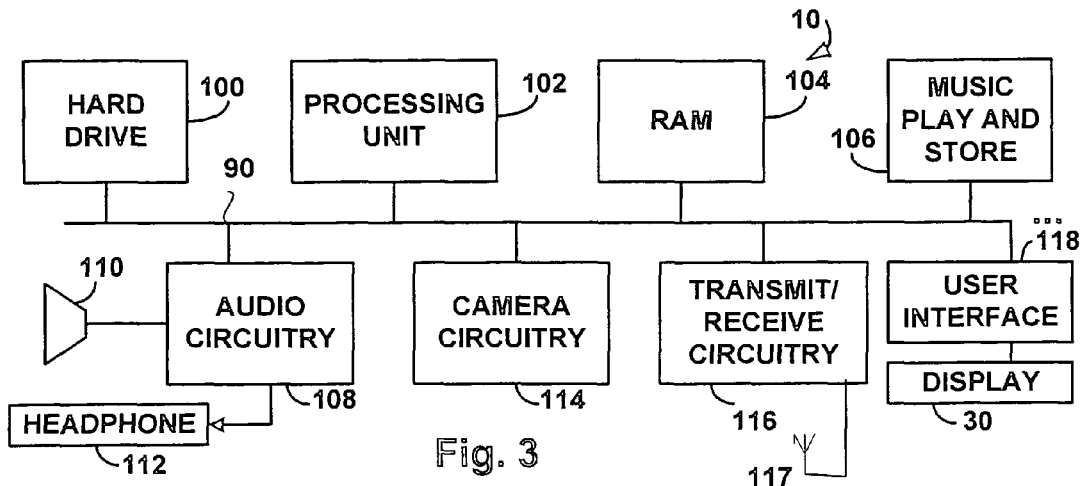
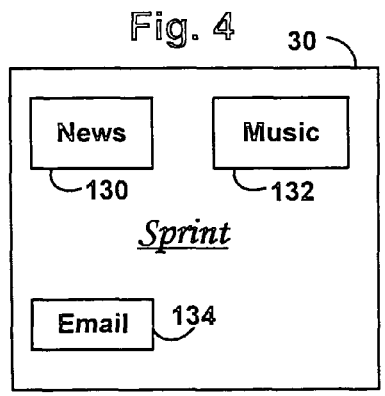
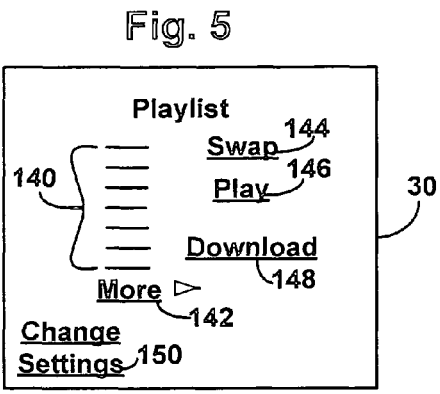
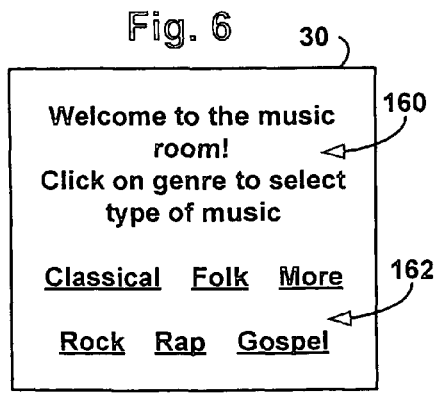
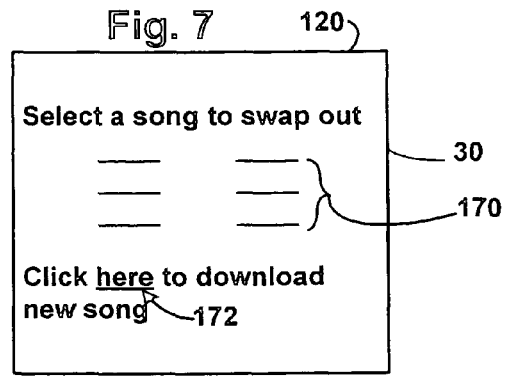

MUSIC SUBSCRIPTION AND DISTRIBUTION FOR WIRELESS DEVICES

CROSS-REFERENCE TO RELATED APPLICATION

This application claims priority benefits to U.S. Provisional application Ser. No. 60/654,282 filed Feb. 17, 2005, the content of which is incorporated by reference herein.

BACKGROUND

1. Field of the Invention

This invention relates generally to methods for distribution of music recordings to wireless communications devices, such as cellular telephones. It also relates to business models for such distribution of music. The term "music recording" is used herein broadly to refer to any recording of music, regardless of the type or genre of the music.

2. Description of Related Art

Wireless communications devices such as personal digital assistants, cellular telephones, and the like can be provided with appropriated hardware and software to provide a platform for playing digital media content, such as music recordings. For example, a cellular telephone may also include an MP3 player and be able to play music downloaded to the cellular telephone.

Music can be distributed to wireless communications devices using several different methods. In one method, music content is streamed from a server on a computer network (such as the Internet) over an air interface to the wireless device using known wireless technology. The wireless device includes buttons or other user interface devices that the user uses to select the media content they wish to experience. A streaming media application (such as a streaming media player from RealNetworks), plays the content as well as provides an interface to a media distribution application resident on the network. The underlying technology for streaming media content to a wireless device is known in the art. Reference is made to U.S. Pat. Nos. 6,587,837; 6,564,263; 6,449,638 and 6,548,747 for background description of the current state of the art. The content of these patents is incorporated by reference herein. Media session announcement, session invitation and session initiation for wireless devices over inter-networks is typically performed in accordance with the Session Description Protocol, which is described in the IETF Request for Comments 2327, M. Handley et al., dated April 1998, the contents of which are incorporated by reference herein. Media session coordination and initiation is also described in U.S. Pat. Nos. 6,205,140 and 6,359,902, the contents of which are incorporated by reference herein.

Another mechanism for distributing music to wireless devices is download and play later. Typically, the device includes an interne browser. The user uses the browser to accesses a web site where music can be downloaded onto the wireless device in a digital format (such as MP3) and stored on the wireless communications device for later play.

Both the streaming and download and play later contexts for distributing media to wireless devices require that the cell phone have substantial memory capacity to store the music files. To meet this need (as well as supply memory for other cell phone functions such as photography), some of the latest generation of cell phones are now equipped with miniature hard drives with 2 gigabit (GB) storage capacity or even more. Other cell phones have slots for large capacity (1-4 GB) flash memory cards. With the advent of cell phones with large memory capacity, the ability for cell phones to compete with MP3 players and other portable media players is now presented.

While the distribution of digital music files to wireless devices has clear consumer appeal, the music publishing industry and copyright holders are wary of new distribution methods due to the potential for unauthorized distribution and copying of copyrighted materials. Thus, for any digital media distribution system to be viable, particularly in the context of music (virtually all of which is the subject of copyright protection), digital rights management techniques must be in place in order to control unauthorized copying and distribution of protected music. U.S. Pat. No. 6,587,837 describes, among other things, a method and system for distribution of electronic media which takes into account these considerations. The techniques of the '837 patent including a secure container containing the media, encryption techniques, and usage condition data which include copy and play restriction data. The '837 patent is also incorporated by reference herein.

This invention provides a user friendly, simple, and easy to implement subscription model for allowing wireless communication devices to access their favorite music and select new favorites, while simultaneously providing for digital rights management and copyright controls to prevent unauthorized distribution and copying of music.

SUMMARY OF THE INVENTION

In a first aspect, a method is disclosed for distributing music to a wireless communications device such as cellular telephone, PDA, or other device that can communicate over an air interface with network. The method includes a step of providing a subscription service for the device. The subscription service allows the device to download up to N music recordings onto the device from an on-line music content distribution site or sites, where N is an integer greater than one. The number of recordings N could be standard for all subscribers, or could vary depending on the level of interest of the customers in having more recordings than usual. For example, there could be a standard number of, say, 20 recordings that are available with a base subscription, but the user could download 30, 40 or more recordings and be billed at a higher rate for the larger number of recordings.

The method continues with a step of providing restrictions designed to prevent effective transport of the music recordings off of the device in digital form such that the recordings cannot be played on other digital devices of any kind. This step can be performed using a variety of techniques, such as for example including hardware or software on the device that blocks attempts to transport or download the recording, through the use of keys or use restriction data that accompany the music recording, or by encryption techniques that encrypt the music and the decryption algorithms are present only on the wireless device.

The method continues with a step of providing, in the subscription service, that the device may play the downloaded music recordings an unlimited number of plays. This feature could be enabled by providing the music without any use restrictions on the device, or by providing use restriction data that gives a value of unlimited for the number of plays available.

The method further continues with the step of providing, in the subscription service, that the device may swap one music recording for another music recording. This feature could be limited to a predetermined maximum number S of swaps over a given period (e.g., 10 per week or other value), or the user could have the option to purchase more swaps. The concept behind the swaps is that the user can change their mix of music on their device, but still not exceed the maximum number N of downloads.

The method further includes a step of billing the customer associated with the device a fee for the subscription service. The fee could be based on the value of N and the number S, or could be a fixed fee for all subscribers. Other variations in the billing could be present, such as the artist or genre of the music that is downloaded. The billing of the user will obviously reflect the royalties that need to be paid by the artists and music publishers, as well as cover the infrastructure and other costs that will be incurred, plus leave some room for a profit. The amount to be billed to the customer could be in terms of a flat fee for up to N downloads, or could be on a per-download basis. The ultimate resolution of how the billing is performed will be influenced by a number of factors, including the overall set-up of the system, the royalty negotiations with the artists and music publishers, the value of N and the number S of swaps, and the perceived value of the service by subscribers, and still other factors.

The hardware and software environment in which the subscription service as described here could be provided is not especially critical. For example, the concepts disclosed in the IBM patent cited above could be modified to provide subscription services as claimed herein, and leveraging the copyright controls, secure container, and other features of the IBM system. As another example, the system and method for streaming media to wireless devices such as cellular phones disclosed in the patent application of Balaji S. Thenthiruperai, Ser. No. 10/821,484 filed Apr. 9, 2004, which is assigned to the assignee of this invention, could be modified such that the wireless devices download music and swap out music in accordance with the subscription concepts of this invention.

In another aspect, the invention can be understood as an improvement to a wireless communications device such as cellular telephone. The wireless communication device includes a processing unit and a memory unit for storing music recordings. The device further includes communications software and hardware, including a browser, for connecting the device over an air interface to an on-line music content distribution site or sites. The device further includes a music application executable by the processing unit implementing a music subscription service, wherein the subscription service allows the device to download up to N music recordings for storage on the memory unit onto the device from the on-line music content distribution site or sites, where N is an integer greater than one. The device further implements restrictions designed to prevent effective transport of the music recordings off of the device in digital form such that the music recordings cannot be played on other digital devices of any kind. The music recordings are distributed to the device such that it may play the downloaded music recordings an unlimited number of plays. Further, in the subscription service, the device may execute swaps comprises an exchange of one music recording for another music recording.

In still another aspect, the invention contemplates a subscription server for distribution of music to wireless devices. The subscription server controls access to music recordings to a plurality of wireless communication devices. In particular, the subscription server accesses a memory storing a plurality of wireless device profiles, wherein each profile includes a value of N and a value of S, wherein N comprises a maximum number of music recordings which may be downloaded to the device for storage and play on the device, the music recording downloaded from an on-line music content distribution site or sites, where N is an integer greater than one; and wherein S comprises a maximum number of swaps in a predetermined period of time, wherein each swap comprises an exchange of one music recording for another music recording.

In a preferred embodiment, the wireless device profiles further comprise an indication of the current number of music recordings downloaded to the device and the current number of swaps executed during the predetermined time period, and wherein the server interacts with the wireless devices and/or content site during attempts of downloading of music or swapping of recordings so as to prevent the user activity from exceeding the value of N or S. Thus, the server acts as a gatekeeper to control the downloading and swapping of music such that the rules of the subscription service, and the user profiles, are observed.

BRIEF DESCRIPTION OF THE DRAWINGS

FIG. 3 is a simplified block diagram of a wireless communications device (such as a cell phone) of FIG. 1, showing a miniature hard drive included in the device which stores music files and a music play and store module which accesses the music files and plays them for the user of the device.

FIGS. 4-8 illustrate sample screen shots on the user interface of the wireless devices of FIG. 1, which show various screen displays which the user navigates through to access their music, download addition music, or swap one music recording for another. The objective of the screen displays is to present an easy to use graphical user interface. The displays are provided by way of example of one possible embodiment and are in no way limiting of other possible displays that could be provided within the scope of this invention, it being understood that the particular details of the display are a matter of design choice and are not particularly important.

FIG. 4 shows an entry or initial screen.

FIG. 5 shows a play list screen showing the current downloaded music and icons for swapping, playing or downloading additional music, and an icon to change the settings (user profile).

FIG. 6 shows a display that appears when the user is seeking for additional music to download.

FIG. 7 is a display that might appears when a user swaps out a music recording for a new music recording.

FIG. 8 shows a display when the user seeks to change their settings.

DETAILED DESCRIPTION

Overview and System Components

Figure 1:
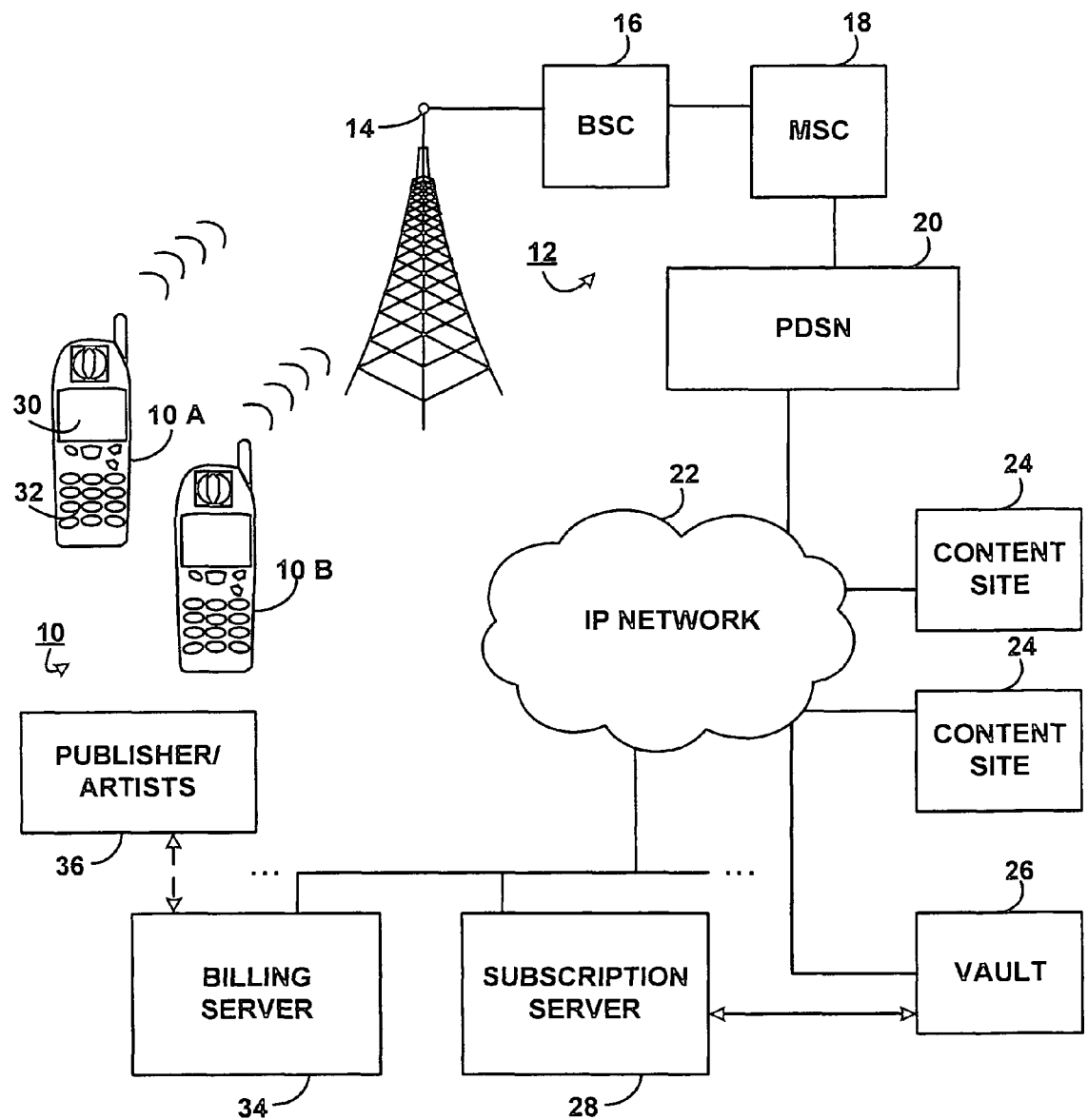
FIG. 1 is a block diagram of a system for distributing music from a music "vault" or content site over an air interface to a wireless communication device with music playing capability, such as a cellular telephone.

FIG. 1 is a block diagram of a representative system in accordance with this invention for distributing music to wireless communication devices 10. In the example of FIG. 1, the wireless devices are cellular telephones 10A, 10B or personal digital assistants. The wireless devices 10 have communications circuitry and an antenna for communicating with a conventional cellular telephone service provider infrastructure 12. This infrastructure, which may be based on CDMA or GSM technology, includes an antenna 14, a base station controller 16 coupled to the antenna, a mobile switching center 18 and a packet data serving node 20. The packet data serving node couples the infrastructure 12 to a packet switched interne protocol wide area network 22. The Internet Protocol network 22, which could be the Internet or a network managed by a cellular telephone service provider. The wireless devices 10 download the music from a source connected to the network 22 and preferably share it locally. The source of the music could be a streaming media server, web server with music content, or a vault containing music recordings and from which music selections are distributed over the network 22 and 12 to the wireless devices 10. In the example of FIG. 1, two content sites 24 are shown, but of course there may be more. Music could also be downloaded from a "vault" 26, which comprises a server storing a set of music recordings.

The wireless devices 10 include a user interface including display screen 30 and buttons 32 or other devices by which a user interacts with the device 10 to select music for downloading and for playing the music. The devices also include a headphone jack. The user operates the user interface to select a music recording they wish to listen to and will typically listen to the music on headphones plugged into the device 10. The devices 10 include a music player application for playing digital music files downloaded and stored on the devices, such as an MP3 player. The user interface of the wireless devices 10 may include speech interfaces, wherein the user interacts with a voice command platform on the network 22 by means of speech, speech recognition engines, text to speech conversion engines, and other techniques commonly found in such systems. Alternatively, the devices 10 may include a touch sensitive display or mouse or other device by which icons appearing on the display are selected. Furthermore, the devices may include a plurality of buttons for navigation or for entry of text.

The devices 10 preferably include a web browser and network connectivity software which allow the device to connect to the IP network 22 and access music distribution or content selection web sites. Two such sites 24 are shown in FIG. 1. However, music content for distribution to the devices 10 could be found on a wide variety of sites, including sites hosted by music publishers and artists, sites set up by music publishers specifically for distribution of on-line media, or content sites where specific music content just for the wireless music distribution of this invention is available. The content could be also stored in a vault 26, and accessed in the manner described in the above-referenced patent application to Thenthiruperai et al. As another example, the content could be hosted in servers as described in the above-referenced IBM patent, or streamed from streaming media servers.

The system further includes a subscription server 28. The basic function of the subscription server is to store a plurality of user profiles and manage the downloading and swapping of music by the devices 10 in accordance with the subscription service described herein and the user profiles. The user profiles contain each user's profile in accordance with the subscription service, such as the number of music recordings the user is allowed to download, the number of swaps they are permitted to make in a given period (e.g., month), the total number of music recordings currently downloaded, and the number of swaps made in the given period. The server 28 may also contain software modules which are accessed by the users and allow the user to inspect their profile and make changes. Each time the user attempts to download or swap a recording, the user request message for a new music recording or a new swap is processed by the server 28 and the request compared with the user's profile. If the user is entitled to download another music recording or made and additional swap, the download or swap process is allowed to proceed. If the user is not authorized to take action, there are several options for action—the user could be given an error message, or the user is given the opportunity to change their profile to be able to purchase more content or perform more swaps.

FIG. 1 also shows a billing system server 34 which is in communication with the subscription server 28. The billing system server 34 has the function of calculating the billing amount for each subscriber based on the user's profile and billing the subscribers. The billing server (or perhaps other server in the service provider network) also determines the royalties that are payable to the artists and publishers 36 based on the music that is subscribed to and sends reports to the artists and publishers 36. The royalties could be decided in accordance with many possible business models.

Music Distribution Method

As noted above, a principal aspect of this invention is a method for distributing music to a wireless communications device. The music distribution method includes a step of providing a subscription service for the device. The subscription service allows the device to download up to N music recordings onto the device from an on-line music content distribution site or sites (such as the content sites 24 or vault 26), where N is an integer greater than one. The subscription service is described in further detail below.

The subscription service also preferably allows each subscriber to swap out one music recording for another and provides a limit, S, on the number of swaps that each subscriber may make for a given period, e.g., week or month. In the swap situation, there is no net gain in the number of music recordings which are downloaded, since the recording that is swapped out is deleted from the music files in the wireless device and a new recording is downloaded in its place.

In one possible embodiment, the subscription service is the same for all subscribers, that is, each subscriber can download up to N music recordings on to their wireless device and make up to S swaps in a given period. It is also possible to allow the user to change their profile to vary either the number of music recordings downloaded (N) or the maximum number of swaps S. Increased values for N and S could carry a premium charge.

The subscription method of this invention also includes a feature of providing restrictions designed to prevent effective transport of the music recordings off of the device in digital form, such that the recordings cannot be played on any other digital devices of any kind. In other words, the wireless devices 10 can download the music from the content sites 24 or vault 26 on the device, but the music is only playable on the wireless devices 10 and cannot, for example, be effectively transferred from the devices 10 onto a CD, memory stick or other memory device, or sent over a network connection (or air interface) to any other media player or computer. To effectuate such security, several possible techniques could be used, including encryption of the music and hard coding of a decryption algorithm in the wireless devices, through the use of restriction data that is included with the music data files when it is downloaded, or through other software or hardware security features present in the wireless devices 10. For example, the devices could be programmed to block access to the music from any application, routine or software modules except a player module that plays the music locally on the device.

The subscription service preferably includes a feature wherein the device may play the downloaded music recordings an unlimited number of plays. It would be possible to limit the number of plays of any recording, such as by including a restriction on use or play in restriction of use data included with the music.

The method further includes a step of billing the customer associated with the device a fee for the subscription service. The billing could be based on a monthly or yearly flat fee. Alternatively, it could be based on the user values of N and S. Alternatively, it could be a pay-as-you-go arrangement and charges are assessed based on actual use. The details of how the service is billed will vary depending on a variety of factors, and thus is not limited to any particular billing or fee structure.

In one possible embodiment, the subscription service allows the user to select the value of N and wherein the billing is dependent, at least in part, on the user selection of the value of N. For example, a customer could sign up for a base service with N=20 at a given flat monthly fee (say, $10 per month), and then if they decide they want more songs, they change their profile and have N set to 30, for a $15 per month fee.

In another possible embodiment, the subscription service is established such that the wireless device may execute a predetermined maximum number (S) of swaps in a predetermined period of time, wherein the subscription service allows the user to select the value of S. For example, the user may sign up to a service with a flat fee of $10 per month and S=20 swaps per month. They may want to swap more often and thus change their profile to S=30. The service provider adjusts the billing wherein the amount the customer pays is dependent, at least in part, on the user selection of the value of S. For example, if S is raised by 50 percent (from 20 to 30), the fee for the music subscription service is raised by 50 percent from $10 per month to $15 per month.

It is thus apparent that the billing for the service could consist of a flat monthly fee for predetermined values of N and S (e.g., a standard subscription plan), and that is possible to allow users to change their plan and change N, S or both. The subscription plan costs will generally increase if N and/or S are increased.

The subscription plan and music distribution method is particularly suitable for use with cellular telephones and other devices that communicate over a wireless communication network. Such devices will need to have an MP3 or other music player application and headphone jack for listening to music. The subscription service may be provided by the provider of cellular telephone service. Alternatively, the music subscription service could be provided by a music publisher or publisher consortium, in which case the user would sign up for the service directly with the subscription service provider. Such service provider would typically make the subscription service available to potential subscribers via a web site that the user navigates to via their wireless device 10. Such service provider could bill the device users using any convenient mechanism such as an online credit card transaction for the monthly subscription fee and additional charges when the user profile is changed.

With the above overview in mind, some further details as to the subscription service will now be explained.

User Profile

As noted above, the subscription server 28 of FIG. 1 performs a role in management of the downloading of music to wireless subscribers to insure that the music downloads and swaps are consistent with the subscription plan applicable to each subscriber and the current status of the user profile. One preferred method for such management is through the use of subscription profiles. Such profiles are preferably implemented as fields in computer memory that contain the applicable subscription data (values of N and S) and current levels of downloads and swaps, for each subscriber.

Figure 2:
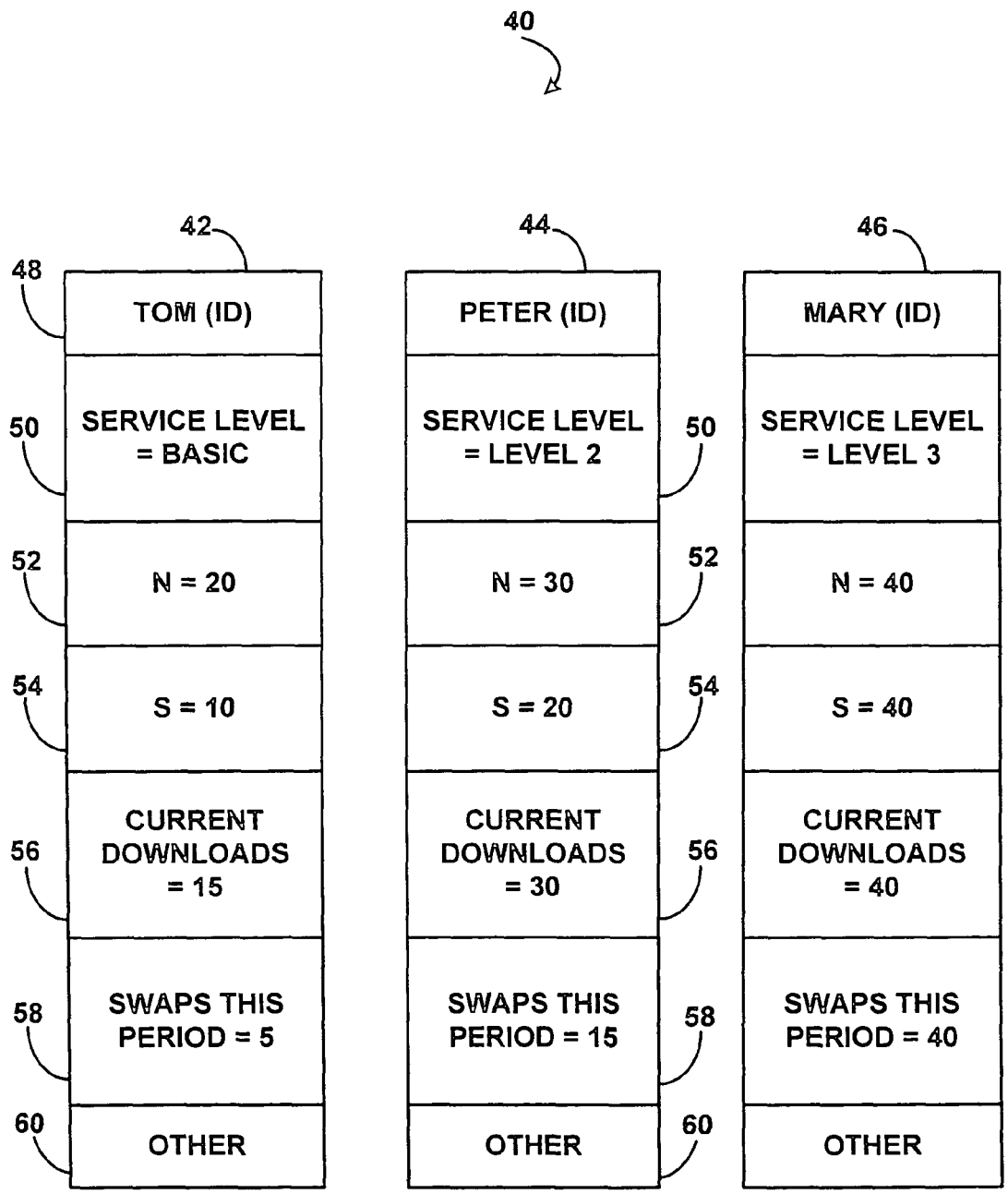
FIG. 2 is an illustration of a plurality of user profiles showing the status of music downloads and swaps for three different subscribers to a music distribution service; the user profiles are stored in memory accessible to the subscription server shown in FIG. 1.

FIG. 2 is an illustration of a block of memory 40 in the subscription server 28 of FIG. 1, showing a plurality of user profiles 42, 44, 46 for three subscribers Tom, Peter and Mary.

The user profiles of FIG. 2 are merely examples of one possible approach to subscriber profiles and thus is not in any way limiting of the scope of the invention. The user profiles 42, 44 and 46 showing the status of music downloads and swaps for the three subscribers to a music distribution service as described herein.

The profiles include a field 48 for identification of the subscriber. This field could include name, address, wireless device serial number or other identification information that is unique to this subscriber.

The field 50 includes the service level that the user has subscribed to. Tom's profile 42 indicates a basic level. Other levels could be provided (as shown in profiles 44 and 46), wherein each level has different features available to the subscriber).

The field 52 indicates the value of N for the level of field 50. For example, Tom is allowed 20 downloads, Peter is allowed 30 downloads, and Mary is allowed 40 downloads.

The field 54 indicates the value of S for the level of field 50. For example, Tom is allowed 10 swaps per month. Peter is allowed 20 and Mary is allowed 40.

The field 56 indicates the current number of downloads that have occurred. Tom is allowed up to 20 downloads but has only downloaded 15. Accordingly, Tom is allowed 5 additional downloads. Both Peter and Mary have downloaded music recordings up to the maximum permitted, as the value in field 56 is the same as the value in field 52 for profiles 44 and 46.

The field 58 indicates the number of swaps that have occurred in the current period (where the period is established in the subscription service as being the period of time in which the user can perform up to S swaps, where is either a fixed number for all subscribers or customizable parameter). Tom has made 5 swaps during this period and can make up to 5 more swaps with his profile 42, Peter can also make 5 more swaps, and Mary has maxed out her swaps since the value in field 58 in profile 46 is the same as the value in field 54.

The user profiles may include additional fields 60 for other information pertinent to the subscription, such as the music recordings that are currently downloaded, account information, status of payments, expiration date of service, other services that are subscribed to, and so forth.

In one embodiment, the profiles 28 are stored locally on the subscription server. This is not absolutely necessary. Indeed, user profiles could be stored in any memory accessible to a subscription server shown in FIG. 1. For example, the user profiles could be stored on another server that contains all of the customer (subscriber) account information, in a subscriber database in a database server, or in a network storage server having mass storage media.

It is also possible to store the user profile locally on the wireless devices, so that the user can access their profile off-line (without communication with the network 22).

Music Download

The music could be transmitted to the user wireless devices over an air interface using streaming media technology and Session Initiation Protocol. Alternatively, the music could be downloaded to the wireless devices directly from the vault or content sites of FIG. 1 using a download and play later method. The cellular telephone service provider could schedule downloads to occur in off-peak hours, using underutilized cell sectors from the base station antennae 14, or in other manner that minimizes over utilization of cellular telephone network infrastructure.

Wireless Communications Device

The music distribution features of this invention are applicable generally to devices which are capable of communicating with a network server over cellular telephony infrastructure. Cellular telephones and wireless personal digital assistants are examples of such devices. This section of this document will describe some of the pertinent aspects of these devices.

Hardware and Software Architecture

FIG. 3 is a simplified block diagram of a wireless communications device (such as a cell phone 10) of FIG. 1. The device 10 includes a miniature hard drive 100 (e.g., with 2 GB capacity) which stores music files downloaded from the content sites 24. The device includes a central processing unit 102, a random access memory for storing program instructions for the processing unit (including operating system, web browser, and other instructions), and a music play and store module 106 containing software instructions for accessing the music files on the hard disk 100 and playing them for the user of the device. The music play and store module 106 may include an MP3 player as well as interactive software for presenting displays on the user interface to allow the user to browse content sites 24 for selection of music, and for downloading and swapping music. Software related to digital rights management, use restriction data, copy restriction, secure containers, encryption and decryption, and other aspects of the U.S. Pat. No. 6,587,837 may be incorporated in the music play and store module 106.

The devices may further include additional modules including audio circuitry 108 for presenting music and other sounds to the user via a speaker 110 or via a headphone jack 112. The device 10 may also includes accessories such as a camera and camera circuitry 114 (for image processing, image storage, image display, etc.). The device 10 will also include transmit and receive circuitry 116 and an associated antenna 117 for transmission over an air interface to the cellular telephone network infrastructure. The device further includes a user interface module 118 including a display driver for presenting graphical information on the display 30 of the device and for receiving user interface commands.

The device further includes a system bus 90 communication between the modules show in FIG. 3.

User Interface

The user interface design of the wireless devices 10, as it relates to the user accessing, downloading, swapping and playing music, is designed to maximize ease of use and simplify operation. The user interface operation maybe incorporated into the music play and store application present in the module 106 of FIG. 3.

In one possible embodiment, the user interface is based entirely on speech recognition and voice processing performed either locally on the device or in a network voice command platform. Such processing can be carried out with the user of Voice Extensible Markup Language (VXML) applications. In this embodiment, the user will access their music favorites such as by speaking "Music". The processor 102 calls up a VXML root document containing a music application. The user interacts with the application by means of speech. For example, they could speak "favorites" and VXML application access the user profile (FIG. 2) and provides speech to the user consisting of the titles of the music they have downloaded onto their device. The user could then speak the title of the song they wish to hear and the application then loads and plays their song.

In a more preferred embodiment, the user interface includes a graphical interface and the user interacts with the display 30 on the device 10. FIGS. 4-8 illustrate sample screen shots on the user interface of the cell phone of FIG. 1, which show various screen displays which the user navigates through to access their music, download addition music, or swap one music recording for another. The objective of the screen displays is to present an easy to use graphical user interface. The displays are provided by way of example of one possible embodiment and are in no way limiting of other possible displays that could be provided within the scope of this invention, it being understood that the particular details of the display are a matter of design choice and are not particularly important.

FIG. 4 shows an entry or initial screen appearing on the display 30 of the device. The display includes icons associated with different features and services that are available on the device, such as an icon 130 for accessing current news reports, an icon 132 for the user to access their music, and an icon 134 for accessing their email. When the user wants to listen to music, they select the icon 132 either using a mouse or other pointer, by activation of up and down or side to side arrows, by touching a touch sensitive screen in the location of the icon, or by other action depending on the configuration of the device.

When the user activates the icon 132, the display of FIG. 5 appears. This display shows a play list screen showing the current downloaded music (140), an icon 142 for toggling over to additional music titles, an icon 144 for swapping, an icon 146 for playing a highlighted or selected song, and an icon 148 for downloading additional music. To play the music, they highlight a recording in the list 140 and then click or select the play icon 146.

If the user wishes to download a new recording, they select the download icon 148. If they wish to swap one recording for another, they select the swap icon 144. If they want to change their settings (user profile), they select the change settings icon 150.

FIG. 6 shows a display that appears when the user activates the icon 148, indicating they wish to download a new recording. The web browser resident on the device is launched and the user is navigated automatically to a web page of a content site. The user is then permitted to browse through the available music and make a selection for downloading. In the example of FIG. 6, the display includes a field 160 showing a welcome message and a prompt for the user to select the type of music they wish to browse through. For example, the field 162 includes icons for various types of music. It would of course be possible to provide a search engine, a field to type in the artist name or album or provide other browsing and music selection features. Additionally, the user is able to navigate to other sites (or vaults) where music available for downloading is listed. Additional displays appear and the user makes a selection for downloading. When the user indicates they wish to download a particular recording, the user profile is consulted to insure that the user has not exceeded the maximum number of downloads and if not, the recording is downloaded (or streamed) to the device. An example of message flow in downloading is described later in FIG. 10.

FIG. 7 is a display that might appears when a user selects the swap icon 144 and attempts to swap out a music recording currently downloaded for a new music recording. The user is presented with a display 170 consisting of their current downloads. The user highlights the recording they wish to delete and selects the icon 172 to download a new recording. The selection of icon 172 could result in deletion of the highlighted recording and navigation to the display of FIG. 6, for example.

Figure 8:
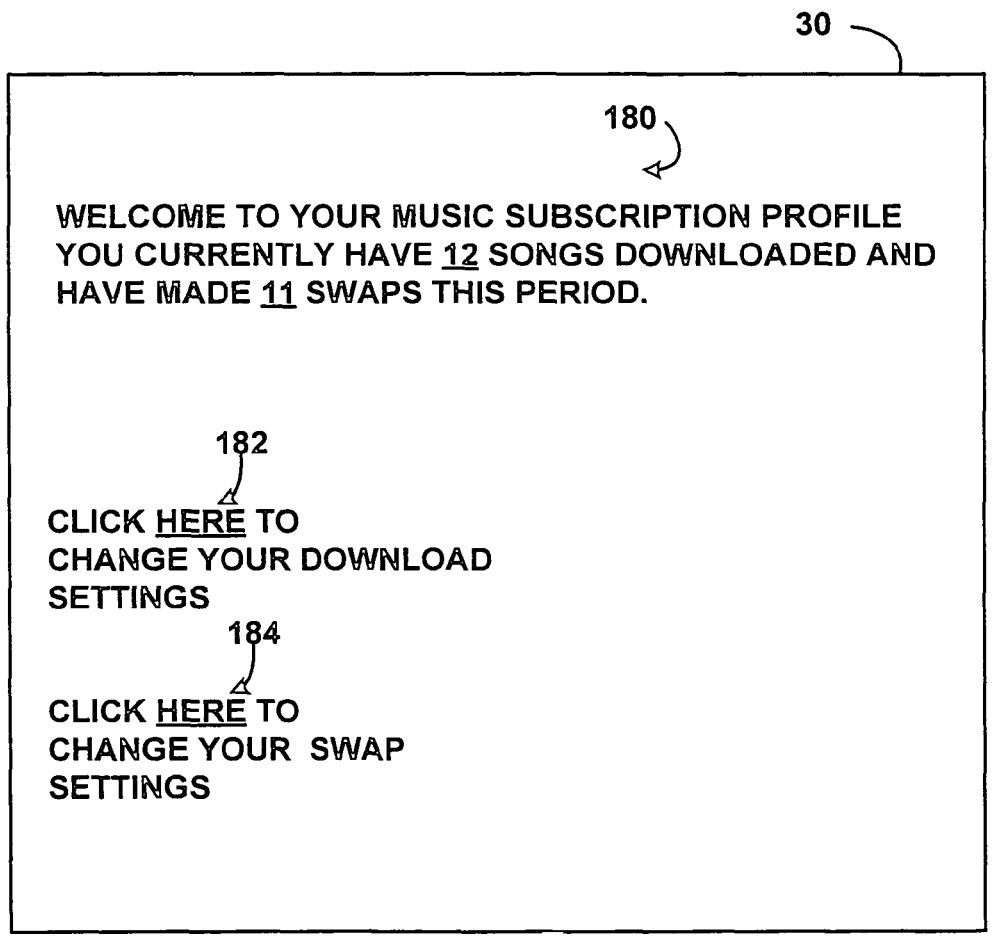

As noted in FIG. 5, the user can change their settings, for example to change the value of N or S. FIG. 8 shows an example of a display that may appear when the user seeks to change their settings. The display includes a field 180 showing pertinent details as to their profile, such as the number of downloads they have made, and the number of swaps in the current period, and perhaps other information such as the values of N and S for their subscription level. The user is prompted to activate icon 182 to change their download settings (increase or decrease N) and activate icon 184 to change their download settings. Either action will prompt additional screens to appear where the user is advised of the availability of additional settings, advised of any additional costs, etc., payment is obtained, and other features. It will be appreciated that during the use of screen of FIG. 8, the user is exchanging data with the subscription server 28 on the network so that the user profile can be updated and saved in memory on the network side of the system. The updated profile may also be saved locally on the device 10.

Web Browser

The present music distribution system envisions multiple music content sites that are hosted on an IP network such as the interne. Such content sites will typically be embodied as web servers serving web pages in HTML or other form to client requests using the HTTP protocol. As such, the music player application resident on the wireless devices preferably includes a web browser to navigate over the Internet and access these web sites. The subscription server 28 may also include web page server functionality and present user profile data to the subscribers in the form of web pages.

Music Player Application

As noted above, the wireless devices 10 include a music player application for accessing music files and playing them locally on the device. The application may take the form of any commercially available application, such as a Windows™ media player application, MP3 player, RealAudio player from Realnetworks, or other music playback application either now known or later developed.

Artist/Publisher Royalties

The subscription service provider will need to negotiate royalty provisions by which artists and publishers are compensated for the access and performance of the copyrighted music. Such royalties could be based on a per-download basis, wherein each time a recording is downloaded (either as a initial music selection or as a swap), the record label or artist is paid a royalty. Royalties could also be based on a flat fee, wherein the inclusion of certain works in the available music library are priced at a certain level, regardless of the number of times the music is downloaded. Combinations of these two approaches are also possible. Obviously, the service provider and publishers and artists will need to work together to arrive at a pricing regime which is fair and agreeable to all parties.

In most situations, the royalty provisions will require that the subscription server (or possibly other entity in the service provider system) keep track of which music is downloaded to the subscribers. This is one of the reasons why it is advantageous to use the subscription server 28 as a central agent for processing download and swap requests from all the subscribers—in additional to making sure the request is consistent with the limits on the subscriber's profile. For example, the service provider could include a master database of works in the entire library of available music and each time a music recording download request is successfully processed, an index or counter associated with that entry in the database is incremented by one. Periodic reports could be generated to show the activity in the current period and such reports would be used as a basis for bulk payment of royalties to all the artists and publishers.

Copy Restrictions

As noted above, the present subscription service contemplates a service wherein music is downloaded onto the wireless communication devices 10 for play, but the devices are prevented from transporting (downloading) the music off of the devices onto any other device (including CD or other storage device). The provision of such copy restrictions could take a variety of forms. Three possible forms are described below.

1. Encryption

A first method of copy restriction is encryption. In this technique, the music file is downloaded to the device in an encrypted fashion. The device 10 has a unique decryption key which allows decryption into a form such that it can be played, but the decryption key is not generally known or available on any other type or kind of media player. The encryption of the music recordings and decryption could be specific to each music recording, or general to all recordings downloaded to the wireless device but unique to the wireless device. The encryption and encryption concepts from IBM patent referenced above, or from other references known in the art, could be used.

2. Restriction on Use Data

A second method could be via restriction of use data that is included with the music recording. Each recording is bundled with restriction of use data that governs the play and transmission of data. The restriction of use data includes a field for number of plays, which would be set to unlimited in one embodiment. The restriction could also include a field for copy or transmission, which would be set to 0 or a null value indicating that copy or transmission is not allowed. Thus, if the user attempted to transport the recording off of the device (e.g., onto a memory card or computer via a cable attached to the device), the restriction of copying field blocks access to the recording.

3. Hardware/Software Controls

The wireless devices could be provided with other software or hardware controls that are designed to prevent any downloading of the music content from the wireless device. For example, the controls may consist of software agent that processes all access requests to the music file and only allows access by the MP3 player on the device. Hardware controls could be provided that take action to prevent transmission, should it be attempted. Such controls could, for example, scramble the music into an unintelligible form, erase the music file, lock up the wireless device, shut down network interface circuits or memory device write circuits, or take some other action.

Subscription Server

Figure 9:
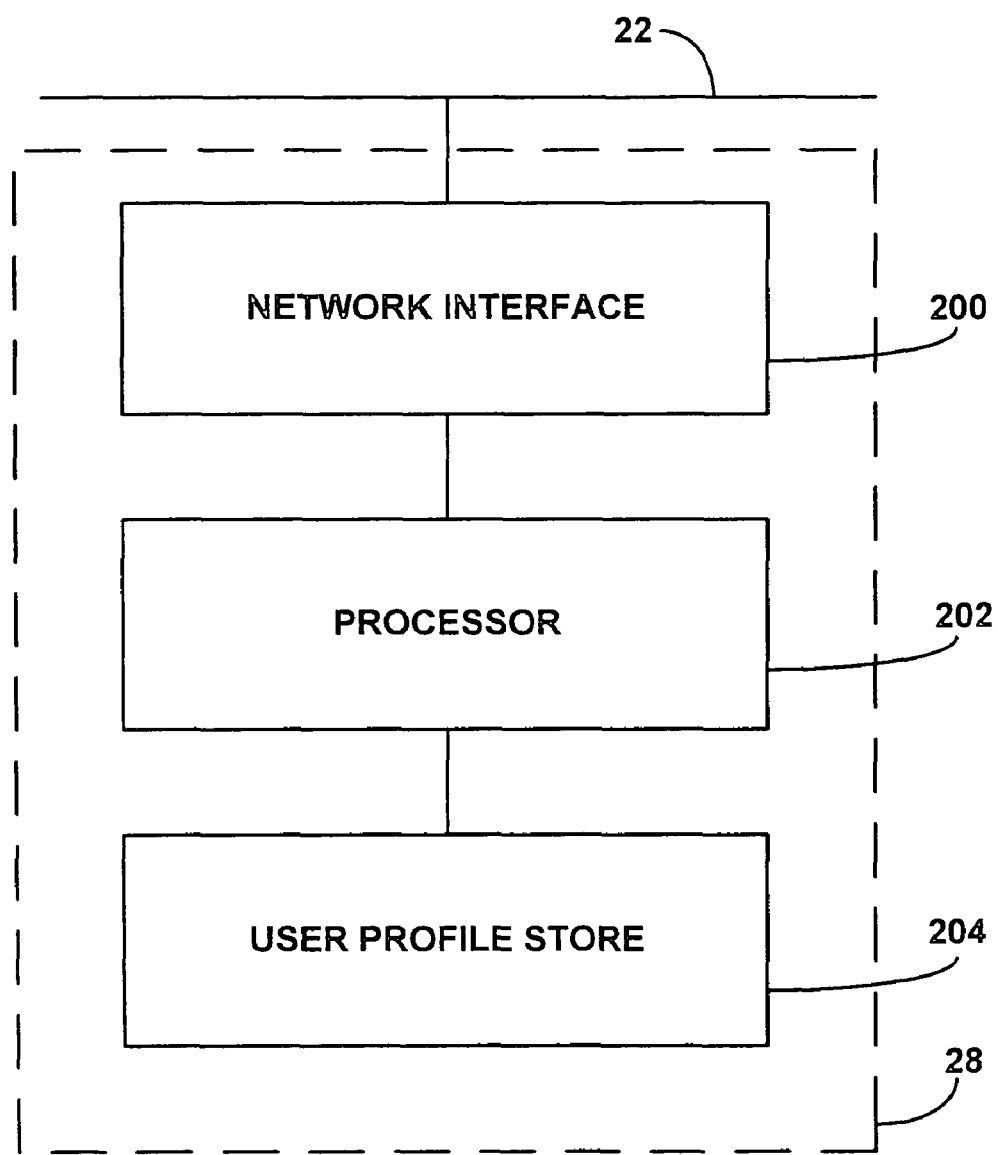
FIG. 9 is a block diagram of the subscription server of FIG. 1.

FIG. 9 shows a block diagram of a subscription server 28 for use in a music distribution system in accordance with this invention. The purpose of the subscription server 28 is to control access to music recordings to a plurality of wireless communication devices. The subscription server 28 includes a network interface 200 for exchanging packets of data with other network entities on the IP network 22 and with the remotely located wireless devices. The server 28 also includes a processor 202, which may take the form of a general purpose computer processing platform. The server also includes a memory 204 storing a plurality of wireless device profiles, examples of which are shown in FIG. 2. Each profile includes a value of N and a value of S, wherein N comprises a maximum number of music recordings which may be downloaded to the device for storage and play on the device, the music recording downloaded from an on-line music content distribution site or sites, where N is an integer greater than one. S comprises a maximum number of swaps in a predetermined period of time, wherein each swap comprises an exchange of one music recording for another music recording. As noted in FIG. 2, the profiles may include additional fields, such as ID fields, current values for downloads and swaps, music titles that are currently downloaded, account information, etc. The profiles could be stored in any convenient format, such as in a relational database or object-oriented database.

In a preferred embodiment, the wireless device profiles include an indication of the current number of music recordings downloaded to the device and the current number of swaps executed during the predetermined time period. The server interacts with the wireless devices during attempts of downloading of music or swapping of recordings so as to prevent the user activity from exceeding the value of N or S. For example, the server 28 could act as a clearing house of all download requests and either allow or deny a request based on the current profile. An example of a message exchange in this situation is shown in FIG. 10 and will be described below.

The server preferably makes the profiles available to the users, e.g., via a web browser implemented in the devices. The user profile is accessible by the wireless devices, wherein the users may interactively change the value of N and S and thus modify their subscription to better suit their needs. Such changes in the profile are reported to the billing server of FIG. 1 so that the billing can reflect the new subscription level.

The subscription server may perform additional functions besides the music subscription service functions described herein, including accounting, authorization, billing, game playing, home agent/foreign agent in Mobile IP networking, voice over Internet Protocol gateway, voice command platform, etc. In one embodiment, the subscription server 28 is configured as an HTML web server. The user profile is accessed by the wireless devices as a HTML web page.

Figure 10:
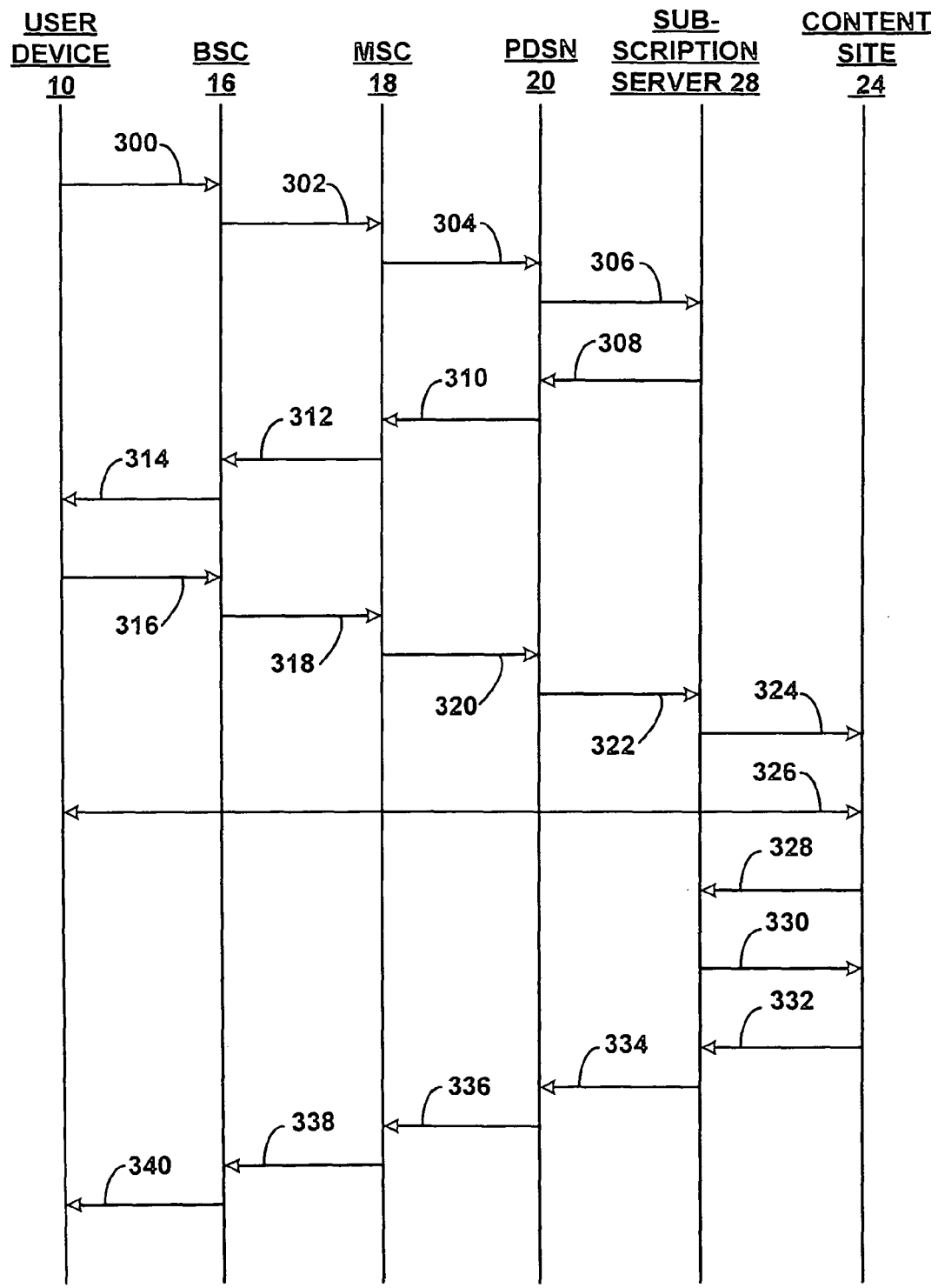
FIG. 10 is a message flow diagram showing a sequence of messages that occurs in a illustrative embodiment when a wireless devices seeks to download or swap a music recording from a content site.

FIG. 10 is a flow diagram of messages between the wireless devices 10 and the other nodes in the system of FIG. 1 during an attempt by a wireless device to download a recording from a content site 24. FIG. 10 is but one possible example of message flow, others are visible with departure from this invention At step 300, the user has launched their music player application and selects the icon 146 of FIG. 5. The application generates an HTTP request packet requesting the web page for content selection, but the destination address is the subscription server 28. The packet is sent to the cellular antenna 14 and then to the base station controller 16.

At step 302, the packet is sent from the base station controller 16 to the mobile switching center 18.

At step 304 the packet is sent to the packet data serving node 20.

At step 306, the packet is sent along network 22 to the subscription server. The subscription server checks the user profile based on the source address in the packet and determines whether the source is a subscriber to the service and is permitted to download music. If the user is not authorized, the server sends an error message (or message indicating the user needs to change their settings), which is then sent through the network entities as indicated by messages 308, 310, 312 and 314.

The user may reply with a new message requesting a change in their settings which is then forwarded through the network entities as indicated by messages 316, 318, 320 and 322.

If the user request for new content is permissible given their profile and current status of downloads and swaps, the user device request for content (HTTP request) is sent to the web server of the content sites as indicated at 324. The content site 28 and user device 10 are placed in communication with each other as indicated at 326 and the user is permitted to browse the content site 24 and make a selection of music.

When a music selection is made, the content site 24 sends a message 328 to the subscription server indicating that a user device wishes to download a music selection. The subscription server checks the profile for the user making the selection and then responds to the content site with an authorization message 330 (if the profile allows the download) or a rejection message if the profile does not allow it. The authorization message could include information to link the authorization to a particular download, e.g., identification of the user, the recording, a time stamp, authorization code, or other information.

If the message 330 is an authorization message, the content site transmits the music recording to the user as indicated by messages 332, 334, 336, 338 and 340. The recording download need not include the server in the path. The message 332 could for example be a confirmation message that the content site is in fact downloading the recording and the content could be sent directly to the PDSN, MSC, BSC and user device directly. When the confirmation message 332 is received, the user profile store is updated to reflect the new download.

From the foregoing, it will be appreciated that a wireless communication device has been described for use in a music subscription service. The devices includes a processing unit 102, a memory unit 100 for storing of music recordings and communications software and hardware 116, including a browser, for connecting the device over an air interface to an on-line music content distribution site or sites; and a music application 106 executable by the processing unit 102 implementing a music subscription service, wherein the subscription service allows the device to download up to N music recordings for storage on the memory unit 100 from on-line music content distribution site or sites, where N is an integer greater than one. The device further implements restrictions designed to prevent effective transport of the music recordings off of the device in digital form such that the music recordings cannot be played on other digital devices of any kind. Examples of these restrictions are described above. Further, the music recordings are distributed to the device 10 such that it may play the downloaded music recordings an unlimited number of plays. In the subscription service, the device may execute swaps comprises an exchange of one music recording for another music recording. In one embodiment, the device 10 comprises a cellular telephone. The subscription service may allow a user of the device to select the value of N. In other embodiments, the subscription service establishes a predetermined maximum number (S) of swaps in a predetermined period of time, and wherein the subscription service allows the user to select the value of S.

While presently preferred and alternative embodiments of carrying out the invention have been described with some particularity, it will be appreciated that variation from the disclosed embodiments is possible without departure from the scope of the invention. This scope will be determined by reference to the appended claims.

I claim:

1. In a system for distribution of music to wireless devices, a subscription server controlling access to music recordings to a plurality of wireless communication devices, the subscription server comprising:

a memory storing a plurality of wireless device profiles, wherein each profile includes a value of N and a value of S, wherein N comprises a maximum number of music recordings which may be downloaded to the device for storage and play on the device, wherein each music recording is downloaded from an on-line music content distribution site or sites, and wherein N is an integer greater than one;

wherein S comprises a maximum number of swaps in a predetermined period of time, wherein each swap comprises an exchange of one music recording for another music recording; and wherein each wireless device profile further comprise an indication of a current number of music recordings downloaded to the respective device and a current number of swaps executed by the respective device during the predetermined time period, and wherein the server interacts with the wireless devices during attempts of downloading of music or swapping of recordings so as to prevent the user activity from exceeding the value of N or S.

2. In a system for distribution of music to wireless devices, a subscription server controlling access to music recordings to a plurality of wireless communication devices, the subscription server comprising:

a memory storing a plurality of wireless device profiles, wherein each profile includes a value of N and a value of S, wherein N comprises a maximum number of music recordings which may be downloaded to the device for storage and play on the device, wherein each music recording is downloaded from an on-line music content distribution site or sites, and wherein N is an integer greater than one;

wherein S comprises a maximum number of swaps in a predetermined period of time, wherein each swap comprises an exchange of one music recording for another music recording;

wherein each wireless device profile is accessible by the respective wireless device, wherein the respective wireless device may interactively change the value of N and S; and wherein the server communicates with a billing system billing the wireless devices, wherein the billing system operates such that the billing for downloading up to N recordings and up to S swaps is done on a flat monthly fee, and wherein the fee varies depending on the user selection of the values of N and/or S.

3. The method of claim 2, wherein the server comprises an HTML web server and wherein each wireless device profile is accessed by the respective wireless device as an HTML web page.

* * * * *